United States Patent [19]

Kaiser et al.

[11] Patent Number: 5,131,293

[45] Date of Patent: Jul. 21, 1992

[54] MOTOR VEHICLE HAVING AN AUTOMATICALLY SHIFTING TRANSMISSION

[75] Inventors: Friedrich-Wilhelm Kaiser, Weissach; Stephan Pelters, Tiefenbronn; Willi Seidel, Eberdingen-Hochdorf, all of Fed. Rep. of Germany

[73] Assignee: Dr. Ing. h.c.F. Porsche AG, Fed. Rep. of Germany

[21] Appl. No.: 570,291

[22] Filed: Aug. 20, 1990

[30] Foreign Application Priority Data

Aug. 31, 1989 [DE] Fed. Rep. of Germany ....... 3928814

[51] Int. Cl.$^5$ ............................................. F16H 59/78
[52] U.S. Cl. ........................................... 74/844; 74/866
[58] Field of Search ................... 74/866, 844, 856; 364/424.1

[56] References Cited

U.S. PATENT DOCUMENTS

| | | | |
|---|---|---|---|
| 2,353,840 | 7/1944 | McKechnie | 74/844 |
| 3,895,541 | 7/1975 | Nohira et al. | 74/844 |
| 4,148,232 | 4/1979 | Moriya | 74/869 |
| 4,566,354 | 1/1986 | Kumura et al. | 74/844 |
| 4,572,029 | 2/1986 | Kinugasa et al. | 74/866 |
| 4,790,215 | 12/1988 | Hamano | 74/866 |
| 4,823,642 | 4/1989 | Iwaki et al. | 74/860 |
| 4,894,780 | 1/1990 | Simonya et al. | 74/866 |

FOREIGN PATENT DOCUMENTS

| | | |
|---|---|---|
| 0171770 | 8/1985 | European Pat. Off. |
| 1954783 | 10/1968 | Fed. Rep. of Germany |
| 2522242 | 12/1975 | Fed. Rep. of Germany |
| 3240153 | 10/1982 | Fed. Rep. of Germany |
| 3341652 | 6/1985 | Fed. Rep. of Germany |
| 3922051 | 7/1989 | Fed. Rep. of Germany |
| 6113052 | 6/1984 | Japan |
| 136529 | 7/1987 | Japan |

OTHER PUBLICATIONS

Bosch Technische Berichte 7 (1983) 4, pp. 160–166, Mohl et al.
Automobiltechnische Zeitschrift (ATZ) 85 (1983)6, pp. 401–405.

*Primary Examiner*—Dirk Wright
*Attorney, Agent, or Firm*—Evenson, Wands, Edwards, Lenahan & McKeown

[57] ABSTRACT

An arrangement for controlling in a motor vehicle an electrohydraulically controlled, automatically shifting transmission driven by an internal-combustion engine. The transmission has several shifting programs optimized according to different design criteria which may be selected either manually by the driver or automatically. Using a temperature sensor, a cold-start condition of the motor vehicle is sensed on the basis of which a transmission control system shifts at least for a limited time period according to a warmup shifting program in such a manner that the internal-combustion engine, under identical driving conditions, generates higher exhaust gas mass flows or exhaust gas energy flows than for gear positions shifted according to a consumption-optimized shifting program.

7 Claims, 4 Drawing Sheets

1

MOTOR VEHICLE HAVING AN AUTOMATICALLY SHIFTING TRANSMISSION

BACKGROUND AND SUMMARY OF THE INVENTION

The present invention relates to an arrangement for controlling in a motor vehicle an automatically shifting transmission driven by an internal-combustion engine and controlled electrohydraulically, the engine being influenced by means of a power control element, such as an accelerator pedal or a throttle valve, and gear positions of the transmission, by at least two shifting programs optimized according to different design criteria, the transmission being automatically shiftable at least as a function of the position of the throttle valve and of the rotational speed of the engine. The shifting programs are manually selectable by the driver or automatically selectable by a change-over strategy as a function of operating or driving parameters.

An electrohydraulically controlled, automatically shifting transmission is described in Bosch "Technische Berichte", (7/1983)4; Pages 160 to 166, and ATZ 85 (1983)6, Pages 401 to 406. This transmission has two shifting programs for the automatic shifting of the gear positions of the transmission which are optimized according to two different design criteria. By means of a switch, the driver of a vehicle may select either a power-optimized or a consumption-optimized shifting program.

German Patent Document DE-33 41 652 C2 and German Patent Document DE 39 22 051.6, which is not a prior publication, show a transmission control system in which the shifting programs are selected automatically by a change-over strategy which is a function of operating or driving parameters. These transmission control systems, for example, by sensing and analyzing accelerator pedal or throttle valve signal values, generate a quantity which is a measurement for a driving style or a driving method of the driver of the motor vehicle. On the basis of this quantity, the transmission control system selects a shifting program which corresponds to the driver's driving method from several shifting programs ranging from a purely consumption-optimized to a purely power-optimized shifting program.

A problem arises if a motor vehicle having such an automatically shifting transmission which is operated by change-over shifting programs, after a cold start of the internal-combustion engine, is driven by the consumption-optimized shifting program for an extended period of time. (In the case of the two last-mentioned transmission control systems this may frequently occur as a result of the advised quick handling with a still cold internal-combustion engine). It was found that as a result of the consumption-optimized operating mode of the motor vehicle, an emission control system which is connected behind the internal-combustion engine and also the internal-combustion engine itself does not reach its operating temperature for an extended period of time. However, particularly in the case of emission control systems, a fast reaching of the operating temperature is extremely important in order to achieve a high pollutant conversion rate.

An object of the present invention is to provide a motor vehicle having an automatically shifting transmission which is driven by an internal-combustion engine, is preferably electrohydraulically controlled and in which the internal-combustion engine and an emission control system connected behind it reach an operating temperature required for a good functioning relatively rapidly.

This and other objects are achieved by the present invention which provides an arrangement for controlling in a motor vehicle an automatically shifting transmission driven by an internal-combustion engine and controlled electrohydraulically. The engine is controllable by a throttle valve and gear positions of the transmission, the transmission being automatically shifted as a function of a position of the throttle valve and a rotational speed of the engine. The arrangement comprises a means for sensing a cold-start condition of the motor vehicle, and a transmission control unit coupled to the means for sensing. This transmission control unit shifts the gear positions of a transmission according to one of at least two shifting programs optimized according to different design criteria. One of the shifting programs is a consumption-optimized shifting program and another of the shifting programs is a warmup shifting program, with the shifting programs being manually selectable by a driver of the motor vehicle or automatically selectable by a change-over strategy as a function of operating or driving parameters. The transmission control unit, as a function of a sensed cold-start condition, shifts the gear positions for at least a limited time period according to the warmup shifting program such that the engine under identical driving conditions generates higher exhaust gas mass or exhaust gas energy flows than for gear positions shifted according to the consumption-optimized shifting program.

An advantage of the present invention is that a motor vehicle is provided which has an automatically shifting transmission which is driven by an internal-combustion engine, is preferably controlled electrohydraulically and in which the internal-combustion engine and an emission control system connected behind it relatively rapidly reach an operating temperature important for their proper functioning without any noticeably increased fuel consumption.

The present invention is easy to implement because it requires only a temperature signal of a corresponding temperature sensor which, as a rule, is normally sensed in motor vehicles and is otherwise limited to a slight expansion of a control program of the transmission control system.

An embodiment of the present invention provides that a cold-start condition of the motor vehicle is sensed by means of the temperature sensor, on the basis of which a transmission control system, at least for a limited time period, shifts the gear positions by means of a specific shifting program in such a manner that, under the same driving conditions, the internal-combustion engine generates higher exhaust gas mass flows or exhaust gas energy flows than in the case of the gear positions shifted by means of a consumption-optimized shifting program.

Other objects, advantages and novel features of the present invention will become apparent from the following detailed description of the invention when considered in conjunction with the accompanying drawings.

DETAILED DESCRIPTION OF THE DRAWINGS

Figure 1:
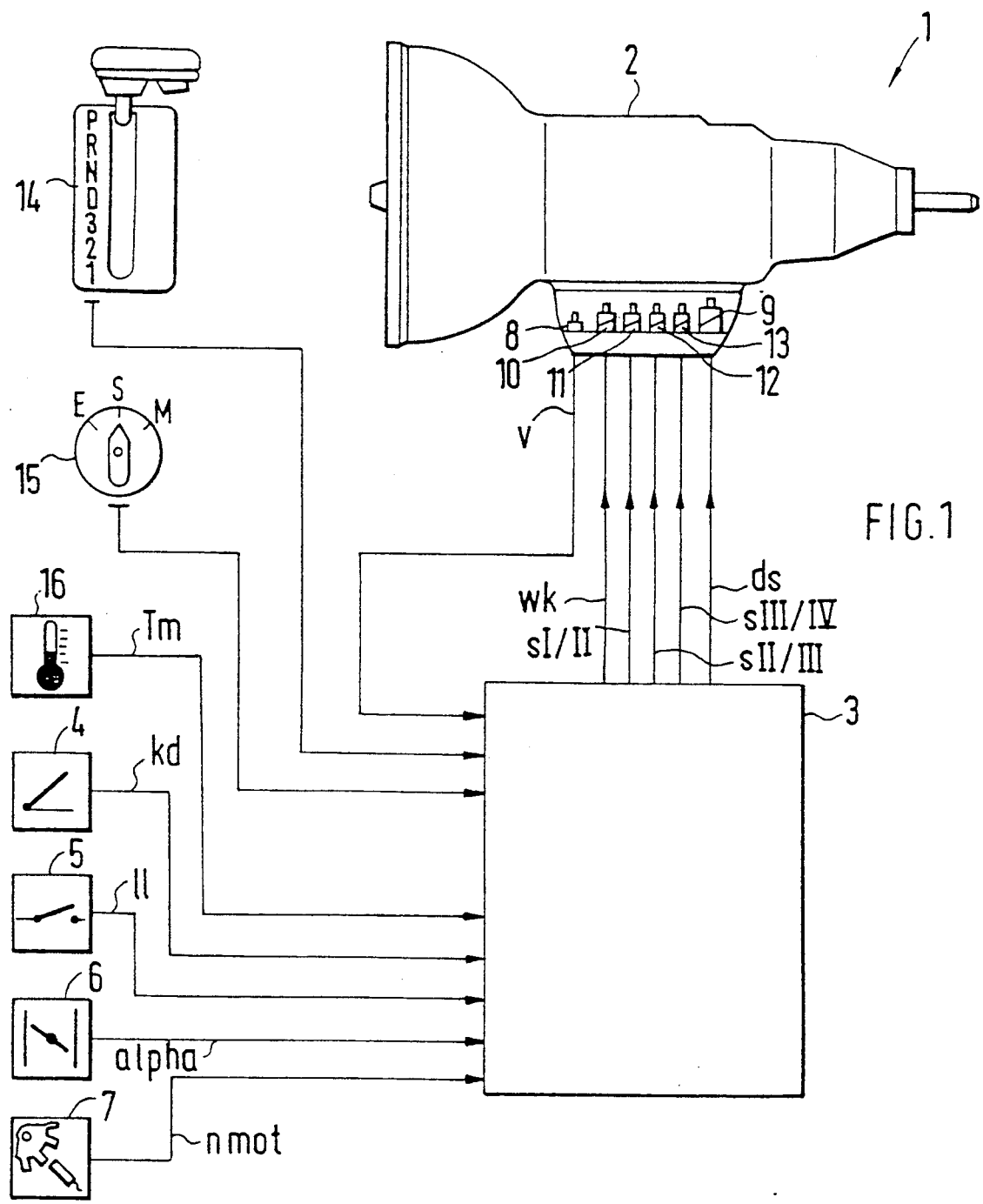
FIG. 1 is a block diagram of an electrohydraulic control system of an automatically shifting transmission of a motor vehicle constructed in accordance with an embodiment of the present invention.

Reference number 1 in FIG. 1 illustrates an electrohydraulic control system of an automatically shifting transmission 2 of a motor vehicle (not shown) driven by an internal-combustion engine in a well-known manner, as described, for example, in Bosch "Technische Berichte", 7(1983)4, Pages 160 to 166, and in ATZ 85 (1983)6, Pages 401 to 405.

As a function of received signals, a control unit 3 controls the following: a pressure regulator 9 for a hydraulic fluid (signal output ds); a first solenoid valve 10 for the control of a converter or of a converter lockup clutch (signal output wk); a second solenoid valve 11 for the control of the gear position change between gear positions I and II (signal output sI/II); a third solenoid valve 12 for the control of the gear position change between gear positions II and III (signal output sII/III); and a fourth solenoid valve 13 for the control of the gear position change between gear positions III and IV (signal output sIII/IV). The received signals used by the control unit 3 include: a kick-down signal kd of a kick-down generator 4 at the accelerator pedal of a motor vehicle as well as an idling signal 11 of a throttle switch 5, a throttle valve angle signal alpha of a throttle valve angle generator 6, an engine rotational-speed signal nmot of an engine rotational speed generator 7 of an internal-combustion engine which is not shown, and a driving speed signal v of a transmission output rotational-speed signal generator 8.

In the illustrated embodiment, the control system may be influenced by the vehicle driver by a selector lever 14 for the preselection of driving positions P, R, N, D, 3, 2, 1 and by a program selection switch 15 for selecting shifting programs E, S, M. In shifting programs E (SKFe) or S (SKFs), in which the shifting operations are controlled in a fully automatic operating mode according to consumption-optimized or power-optimized criteria, driving positions P (Parking), R (reverse gear position), N (idling gear position), D (all four gear positions IV, III, II, I), 3 (limiting to the three lowest gear positions III, II, I), and 2 (limiting to gear positions II and I), and 1 (limiting to the first gear position I) can be selected. A shifting program M for a semi-automatic operating mode, however, will not be described here as it is beyond the scope of the present invention.

The transmission control system is now expanded by one temperature sensor 16 which is used for sensing the cold-start condition of the motor vehicle. For this purpose, for example, the coolant temperature Tm of the internal-combustion engine may be sensed, and a corresponding signal emitted to the control unit 3. As a alternative, it is also contemplated to sense a temperature Tg of a coolant and/or a lubricant of the transmission or to directly sense a temperature Ta of an emission control system (catalyst) or of a gas flow flowing through it.

Figure 2:
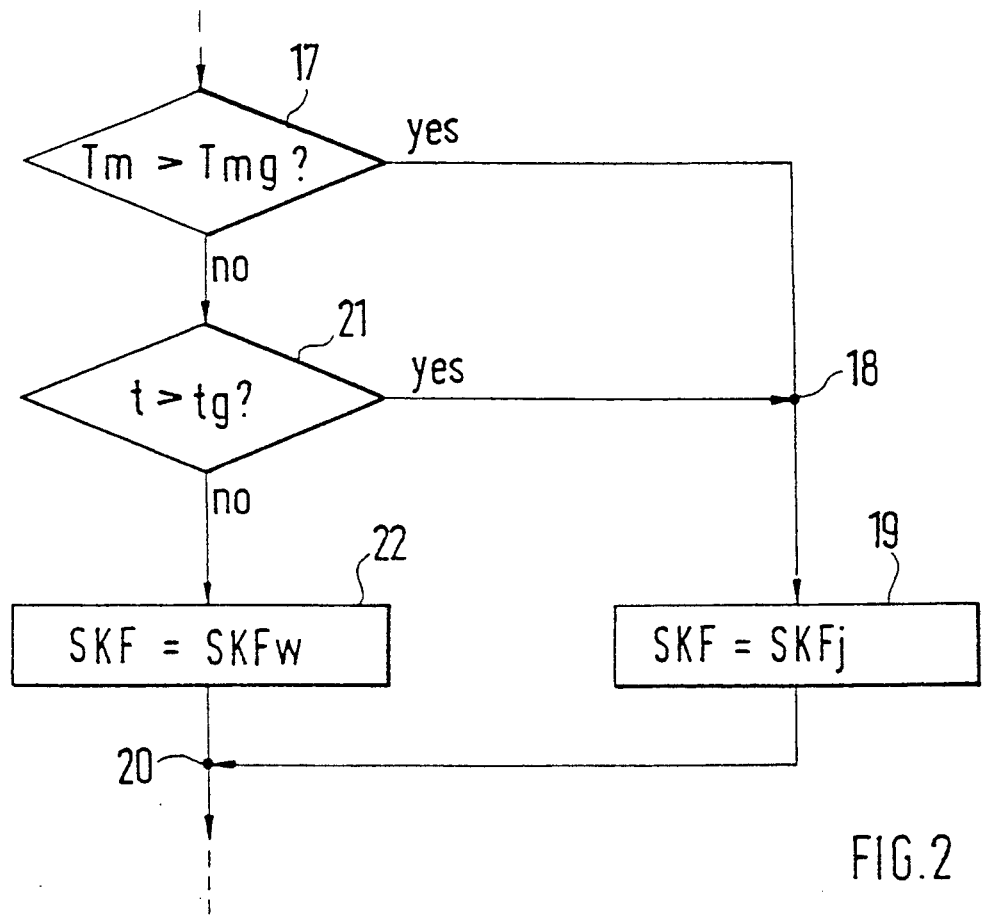
FIG. 2 is a flow chart for the expansion of a transmission control system.

A control program or control process of the control unit 3 is now expanded corresponding to FIG. 2. The expansion may, for example, be built in at a program position at which normally the program selection switch 15 is scanned or a change-over strategy takes place for the automatic change-over of the shifting programs as described in German Patent Documents DE 33 41 652 C2 or DE P 39 22 051.6.

In decision step 17, it is queried whether the coolant temperature Tm in the internal-combustion engine is higher than an engine temperature limit value Tmg. Alternatively, it may also be checked whether a coolant or lubricant temperature Tg of the transmission is higher than a transmission temperature limit value Tgg or whether a temperature Ta of the emission control system or of a gas flow flowing through it is higher than an emission control temperature limit value Tag.

If the query in decision step 17 is positive, after passing a program point 18, in step 19 the shifting program is determined corresponding to a switch position (or to the automatic change-over strategy) of the program selection switch 15. Subsequently, a return to the regular transmission control program takes place by way of a branching point 20.

If the query in decision step 17 is negative, it is checked whether a time period t beginning after the starting of the internal-combustion engine is already longer than a limited time period tg which may take place, in a manner known per se, by means of a time-metering loop. If condition 21 is met, the program is continued again with program point 18; if it is not met, however, a so called warmup shifting program SKFw is determined or addressed, 22, and the program is continued at branching point 20.

As a result of this warmup shifting program SKFw, the gear positions g of the transmission are shifted such that the internal-combustion engine under identical driving conditions generates higher exhaust gas mass flows or exhaust gas energy flows than in the case of the gear positions g shifted by a consumption-optimized shifting program. The manual or automatic selection of the shifting programs SKFj is therefore suppressed as long as the cold-start condition is present (negative query in step 17) or the time period tg is not yet exceeded (negative query in step 21).

As an alternative, certain embodiments provide that during the automatic selection of the shifting programs, in addition to the warmup shifting program SKFw, additional shifting programs are permitted, according to which the internal-combustion engine under identical driving conditions generates still higher exhaust gas mass flows or exhaust gas energy flows than in the gear positions g shifted by the warmup shifting program SKFw.

Figure 3:
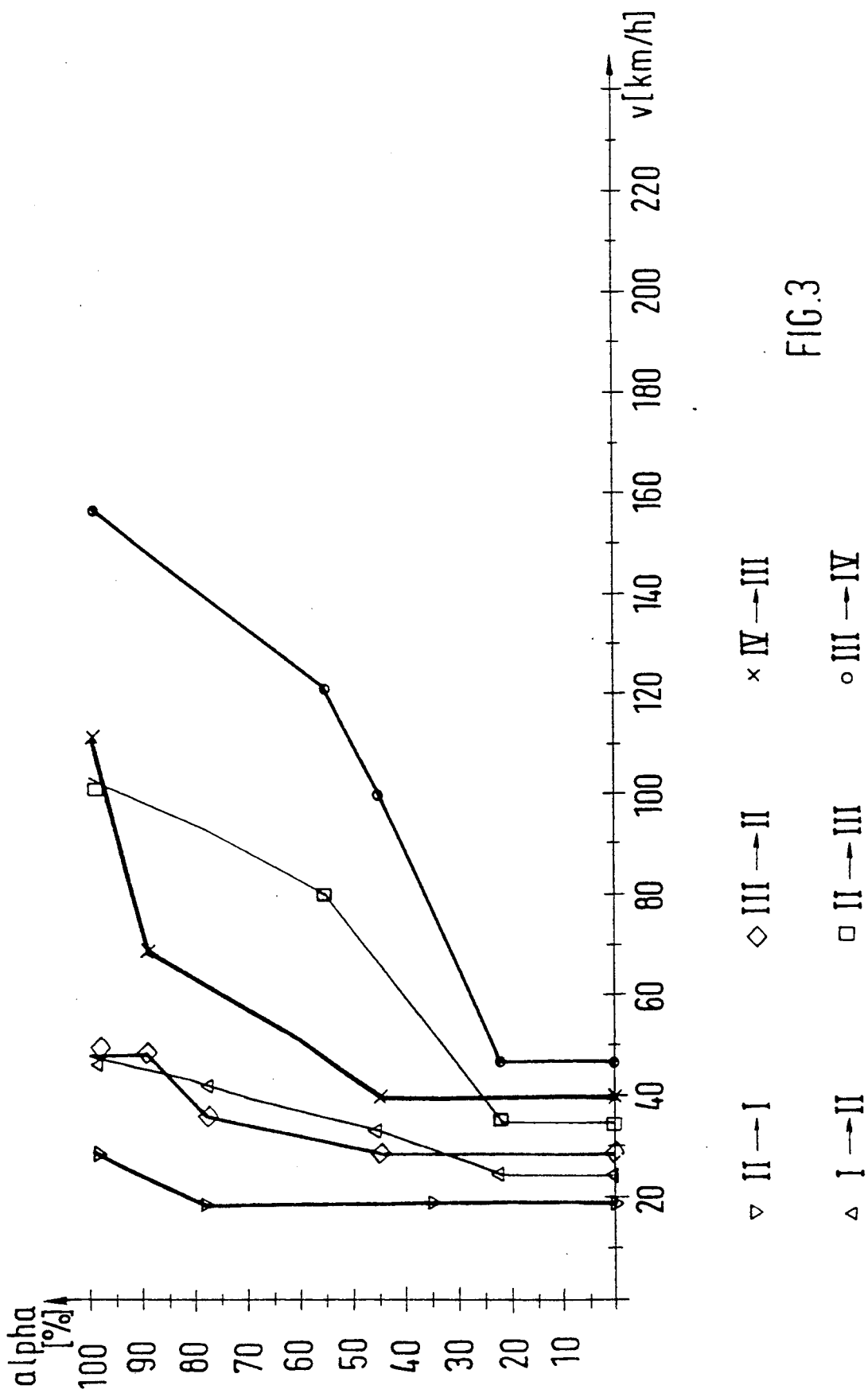
FIG. 3 is a consumption-optimized shifting program.
Figure 4:
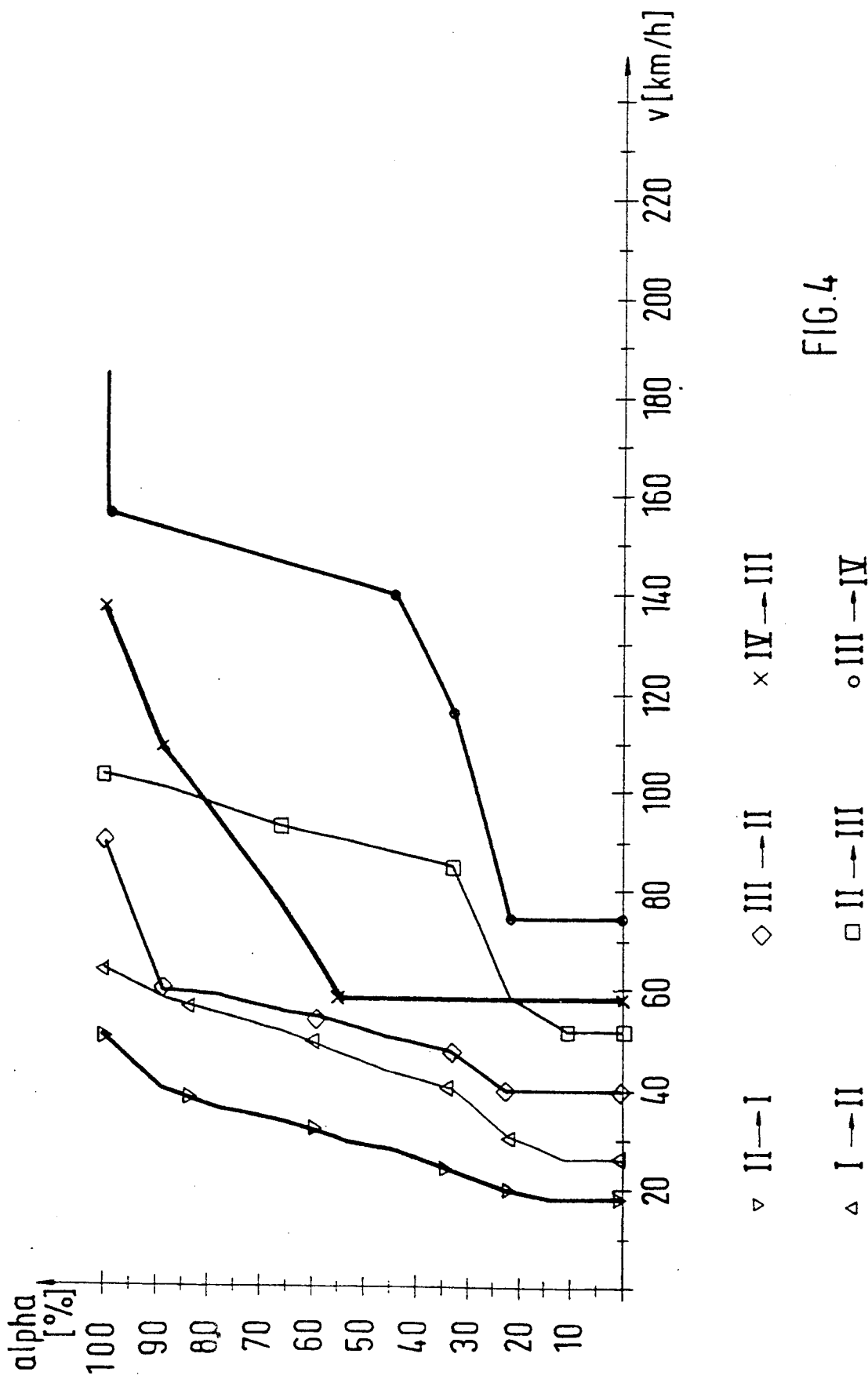
FIG. 4 is a warm-up shifting program.

In FIGS. 3 and 4, two shifting programs are shown according to which the gear positions are changed corresponding to the driving speed v and the throttle valve position alpha if an operating point of the motor vehicle exceeds or falls below the corresponding shifting curves. While FIG. 3 shows a consumption-optimized shifting program SKFe, FIG. 4 shows a warmup shifting program SKFw.

In a direct comparison, it is shown, for example, by means of the characteristic upshift curve from g=III to g=IV that the upshifting at a throttle opening degree of 45%, does not take place as early as at 100 km/h, but not before 140 km/h so that the internal-combustion engine reaches much higher rotational speeds and thus significantly larger mixed mass flows pass through it.

As a result, the internal-combustion engine is warmed up faster and, because of the higher temperature and energy level in the exhaust gas, the emission control system reaches its operating temperature faster. In this case, the time period tg will be in the range of a few seconds to a few minutes. Although, under certain circumstances, this may result in a momentarily slightly increased consumption, this slightly increased consumption occurs only during time period tg and can be compensated by the faster warmup of the internal-combustion engine.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An arrangement for controlling in a motor vehicle an automatically shifting transmission driven by an internal-combustion engine and controlled electrohydraulically, the engine being controllable by a throttle valve and gear positions of the transmission, the transmission being automatically shifted as a function of at least a position of the throttle valve and a rotational speed of the engine, comprising:

means for sensing a cold-start condition of the motor vehicle; and a transmission control unit coupled to the means for sensing, said transmission control unit shifting a plurality of the gear positions of a transmission according to one of at least two shifting programs each having a plurality of characteristic curves optimized according to different design criteria, one of said shifting programs being a consumption-optimized shifting program and another of said shifting programs being a warmup program, said shifting program being manually selectable by a driver of the motor vehicle or automatically selectable by a change-over strategy as a function of operating or driving parameters, said transmission control unit, as a function of a sensed cold-start condition, shifting each of the plurality of the gear positions for at least a limited time period according to the plurality of characteristic curves of one of said shifting programs such that the engine under identical driving conditions generates higher exhaust gas mass or exhaust gas energy flows than for gear positions shifted according to the consumption-optimized shifting program, whereby said warmup program is the program used during both upshifting and downshifting during the cold-start condition of the motor vehicle.

2. An arrangement according to claim 1, wherein the manual or automatic selection of the shifting programs is suppressed as long as the cold-start condition is present or the time period is not yet exceeded.

3. An arrangement according to claim 2, wherein only when the shifting programs are selected automatically, other shifting programs in addition to the warmup shifting program are allowed in which the internal-combustion engine, under identical driving conditions, generates higher exhaust gas mass flows or exhaust gas energy flows than in gear positions shifted according to the warmup shifting program.

4. An arrangement according to claim 1, wherein the means for sensing the cold-start condition includes means for measuring a coolant temperature of the internal-combustion engine and means for comparing the coolant temperature with an engine temperature limit value.

5. An arrangement according to claim 1, wherein the means for sensing the cold-start condition includes means for measuring a coolant temperature of the transmission and means for comparing the coolant temperature with a transmission temperature limit value.

6. An arrangement according to claim 1, wherein the means for sensing the cold-start condition includes means for measuring a temperature of an emission control system (catalyst) or of a gas flow flowing through a control system and means for comparing the temperature with an emission control temperature limit value.

7. A method of automatically shifting a transmission coupled to an engine of a motor vehicle according to one of at least two gear position shifting programs optimized according to different design criteria, with one of said shifting programs being a warmup shifting program and another of said shifting programs being a consumption-optimized shifting program, comprising:

sensing a temperature of a motor vehicle operating parameter;

comparing the sensed operating temperature with a limit value;

shifting the gear positions of the transmission according to the warmup shifting program if the sensed temperature is lower than the limit value such that the engine under identical driving conditions generates higher exhaust gas mass flows or exhaust gas energy flows than for gear positions shifted according to the consumption-optimized shifting program, whereby said warmup program is the program used during both upshifting and downshifting when said sensed temperature is lower than the limit value.

* * * * *